(12) United States Patent
Ravenberg et al.

(10) Patent No.: US 8,596,678 B2
(45) Date of Patent: Dec. 3, 2013

(54) AIR BAG WITH PRESSURE-MANAGED GAS DELIVERY INFLATABLE DUCT

(75) Inventors: Mike Ravenberg, Corinne, UT (US);
Balaskandan Shankar, Salt Lake City, UT (US); Patrick Jamison, North Ogden, UT (US); Arthur Yakumo, Salt Lake City, UT (US); Larry F. Lunt, Brigham City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 371 days.

(21) Appl. No.: 12/573,460

(22) Filed: Oct. 5, 2009

(65) Prior Publication Data
US 2011/0079991 A1    Apr. 7, 2011

(51) Int. Cl.
*B60R 21/207* (2006.01)
*B60R 21/21* (2011.01)
*B60R 21/231* (2011.01)
*B60R 21/233* (2006.01)
*B60R 21/262* (2011.01)
*B60R 21/26* (2011.01)

(52) U.S. Cl.
USPC ..... 280/736; 280/729; 280/730.1; 280/730.2; 280/742; 280/743.1

(58) Field of Classification Search
USPC .......... 280/740, 736, 729, 730.1, 730.2, 742, 280/743.1
IPC ............... B60R 21/207, 21/21, 21/231, 21/233, B60R 21/262, 21/26
See application file for complete search history.

(56) References Cited

U.S. PATENT DOCUMENTS

| | | | |
|---|---|---|---|
| 5,951,038 A * | 9/1999 | Taguchi et al. | 280/729 |
| 6,457,744 B1 | 10/2002 | Tonooka | |
| 6,478,329 B1 | 11/2002 | Yokoyama | |
| 6,827,368 B2 * | 12/2004 | Jang et al. | 280/729 |
| 6,866,291 B2 * | 3/2005 | Abe et al. | 280/729 |
| 6,926,303 B2 * | 8/2005 | Fischer et al. | 280/729 |
| 7,025,164 B2 * | 4/2006 | Takimoto | 180/274 |
| 7,090,245 B2 * | 8/2006 | Yoshikawa et al. | 280/729 |
| 7,111,866 B2 * | 9/2006 | Abe et al. | 280/729 |
| 7,168,733 B2 | 1/2007 | Kumagai et al. | |
| 7,195,275 B2 * | 3/2007 | Abe | 280/729 |
| 7,347,444 B2 | 3/2008 | Wheelwright | |
| 7,364,188 B2 * | 4/2008 | Hasebe et al. | 280/732 |
| 7,431,329 B2 * | 10/2008 | Taguchi et al. | 280/729 |
| 7,458,605 B2 * | 12/2008 | Hasebe et al. | 280/729 |
| 7,631,891 B2 * | 12/2009 | Washino | 280/731 |
| 7,637,530 B2 * | 12/2009 | Yamaji et al. | 280/730.2 |
| 7,942,440 B2 * | 5/2011 | Choi | 280/740 |
| 8,215,665 B2 * | 7/2012 | Ohara et al. | 280/729 |
| 2004/0113399 A1 | 6/2004 | Yoshikawa et al. | |
| 2004/0195807 A1 * | 10/2004 | Hasebe et al. | 280/728.1 |
| 2005/0248132 A1 | 11/2005 | Wheelwright | |
| 2006/0267325 A1 * | 11/2006 | Kumagai et al. | 280/753 |
| 2007/0145730 A1 * | 6/2007 | Choi | 280/740 |
| 2008/0048420 A1 * | 2/2008 | Washino | 280/731 |
| 2011/0285114 A1 * | 11/2011 | Ohara et al. | 280/730.1 |
| 2012/0112441 A1 * | 5/2012 | Ohara | 280/729 |

* cited by examiner

*Primary Examiner* — Joseph Rocca
*Assistant Examiner* — Joselynn Y Sliteris
(74) *Attorney, Agent, or Firm* — Madson IP, P.C.

(57) ABSTRACT

An inflatable side airbag has an inflatable duct for the delivery of inflation gas. The inflatable duct of the inflatable side airbag provides for rapid deployment of a multi-chamber air bag while controlling the rate of inflation and the relative pressure of the chambers. The inflatable duct allows a single inflator to inflate a high pressure pelvis chamber and a lower pressure thorax chamber while preventing fluid communication between the two chambers upon completion of inflation.

18 Claims, 6 Drawing Sheets

AIR BAG WITH PRESSURE-MANAGED GAS DELIVERY INFLATABLE DUCT

BACKGROUND OF THE INVENTION

Airbags and airbag systems are known in the art and are now standard on motor vehicles. These airbag systems generally are designed such that in the event of an accident or a crash, an inflatable airbag will become positioned between a vehicle occupant and an interior object or surface and will prevent the vehicle occupant from harmful impact with a portion of the vehicle interior. As is known in the art, airbags are currently added to the vehicle's steering wheel, dashboard, and/or at other locations within the vehicle. The inclusion of these airbag systems within motor vehicles have been credited with saving many lives and preventing many injuries.

Many typical airbag systems comprise several individual components joined to form an operational module. Such components generally include an airbag cushion, an airbag inflator, a sensor, and an electronic control unit. Airbag cushions are typically made of a thin, durable fabric that is folded to fit into a compartment of a steering wheel, dashboard, interior compartment, roof, roof rail, seat, or other space in a vehicle. The airbag inflator is designed to produce a gas to rapidly inflate the cushion when needed. The sensors detect sudden decelerations of the vehicle that are characteristic of an impact. The readings taken by the sensors are processed in the electronic control unit using an algorithm to determine whether a collision has occurred.

Upon detection of an impact of sufficient severity, the control unit sends an electrical signal to the inflator. The inflator uses one of many technologies, including pyrotechnic compounds and/or pressurized gas, to produce a volume of inflation gas. The inflation gas is channeled into the airbag, rapidly inflating it. Inflation of the airbag causes it to deploy, placing it in position to receive the impact of a vehicle occupant. After contact of the occupant with the airbag and the corresponding deceleration of the occupant, the airbag deflates, freeing the occupant to exit the vehicle.

Airbag apparatuses have been primarily designed for deployment in front of an occupant between the upper torso and head of an occupant and the windshield or instrument panel. However, alternative types of airbags such as knee bolsters and overhead airbags operate to protect various parts of the body from collision. Side impact airbags such as inflatable curtains and seat mounted airbags also have been developed in response to the need for protection from impacts in a lateral direction, or against the side of the vehicle.

It has been discovered that various parts of the body require different levels of impact protection. For example, a seat mounted airbag may inflate beside an occupant in a vehicle seat to protect the pelvis and thorax of the occupant against lateral impact. The weight of the occupant may generally tend to slide with the pelvis; hence, it may be beneficial for the pelvis portion of the seat mounted airbag to inflate stiffly to provide comparatively firm protection. By contrast, the thorax is more sensitive and generally carries less mass, and thus should preferably be more softly cushioned during impact to avoid potential injury to an occupant's ribs.

Dual chambered side impact airbags have been developed to provide a pressure differential between the pelvis and thorax portions of a side airbag. These airbags have two separate chambers, typically one on top of the other. The top chamber is used for providing impact protection for the thorax of an occupant in a seat and the bottom chamber is used to provide impact protection for an occupant's pelvis. In these systems, an inflator is placed in a housing that has multiple orifices for channeling inflation gases into both chambers. The pelvis chamber is inflated to a higher pressure than that of the thorax chamber.

Often a single inflator is used to deliver inflation gas to both the top chamber and the lower chamber. The single stream of inflation gas is channeled into both chambers by way of a diffuser. By varying the cross sectional areas of ports providing fluid communication between the diffuser and the chambers, the relative pressure of each of the chambers can be controlled. However, as the required pressure differential grows, there exists the potential for backflow wherein the inflation gas contained in the high-pressure chamber flows back into the low-pressure chamber by way of the fluid communication provided within the diffuser. As a result, it is difficult to obtain the high pressures required for the pelvis portion of the airbag while simultaneous inflating the thorax portion of the airbag to a low pressure.

Accordingly, there is a need in the art for a type of air bag that allows a single inflator to inflate multiple chambers within an airbag to pressure differentials greater than that currently available.

BRIEF SUMMARY OF THE INVENTION

Embodiments of an inflatable air bag are disclosed herein. The inflatable air bag has a first inflatable chamber and a second inflatable chamber located adjacent the first inflatable chamber. An inflatable duct is disposed intermediate the first chamber and the second chamber with the inflatable duct having an inlet for receiving inflation gas. The inflatable duct includes a first valve set comprising at least one first valve providing fluid communication between the inflatable duct and the first chamber and a second valve set comprising at least one second valve providing fluid communication between the inflatable duct and the second chamber. The delivery of an inflation gas to the inlet causes the inflatable duct to inflate thereby exposing at least one of either the first valve set and the second valve set to the inflation gas for allowing inflation of at least one of either the first inflatable chamber and the second inflatable chamber, respectively.

The relative inflation rates and pressures of each of the chambers associated with the valves can be controlled by adjusting the features of the inflatable duct. The duct may be tuned to allow one chamber to continue inflating after another chamber has completed inflation. As the pressure within the duct falls below a pressure required to maintain inflation, the duct collapses and fluid communication in the collapsed section of the duct is minimized. Therefore, the duct can be tuned such that substantially no fluid communication exists between the chambers after a chamber inflates to its required pressure.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the present invention, as represented in the figures, is not intended to limit the scope of the invention, as claimed, but is merely representative of presently preferred embodiments of the invention.

Figure 1:
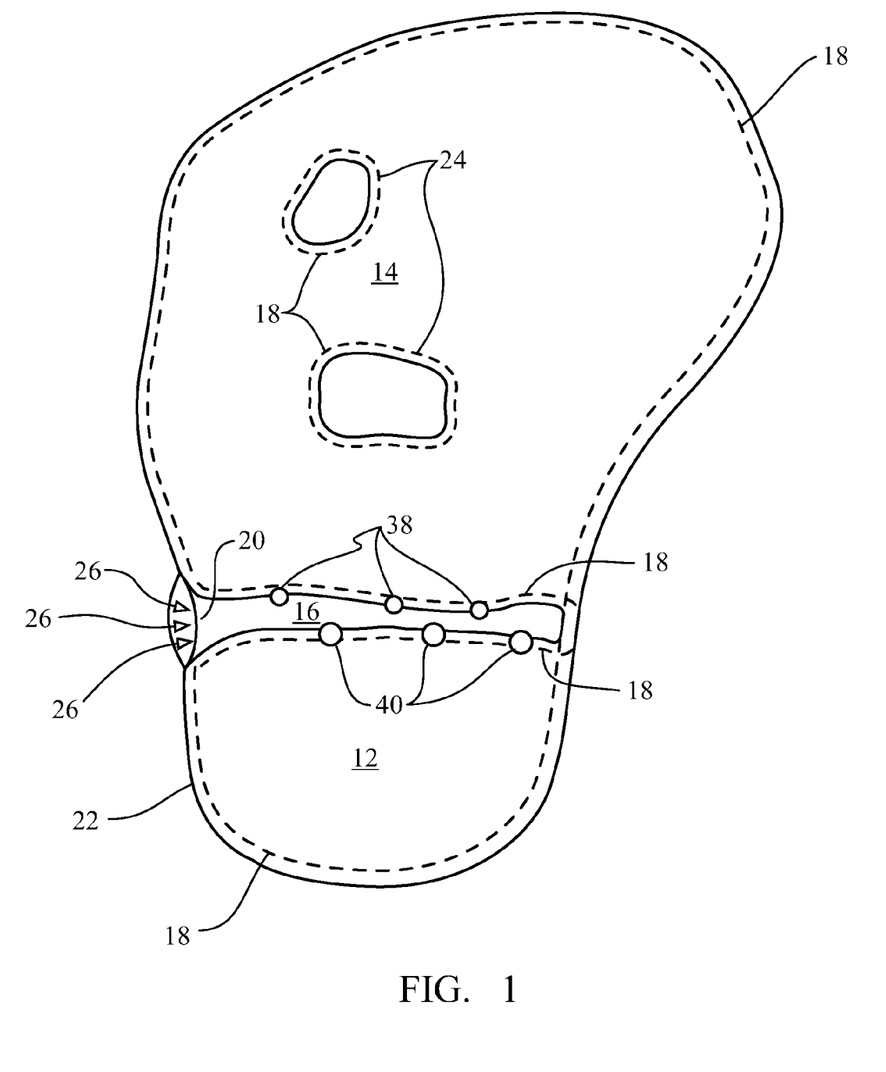
FIG. 1 is a side plan view of an airbag showing the chambers and the inlet of the inflatable duct.

Referring now to FIG. 1, an inflatable air bag 10 according to the present embodiments is illustrated. The inflatable air bag 10 shown in FIG. 1 is formed by sheets of material having stitching 18 at the inflatable air bag perimeter 22. Stitching 18 around the perimeter 22 forms chambers 12 and 14 between the sheets of fabric. The stitching 18 seals the sheets of material enabling the chambers 12 and 14 to be inflated when an inflation gas 26 is channeled into the chambers 12 and 14. The inflation gas 26 may be channeled into the chambers 12 and 14 by way of an inlet, a valve, duct, permeable membrane, or any other type of gas delivery mechanism known in the art. As an alternative to stitching, the perimeter can be sealed using known techniques such as adhesive bonding, solvent bonding, chemical bonding, welding, or the like. Moreover, the illustrated stitching is merely exemplary and may have any configuration that provides chambers for suitable inflation.

In addition to the stitching 18 at the perimeter 22, the inflatable air bag 10 may have stitching 18 that is not located along the perimeter 22 of the air bag 10. For example, in FIG. 1 stitching 18 creates zero-length tethers 24 intermediate the perimeter 22. The zero-length tethers 24 control the width of the airbag 10 by attaching the sheets of material directly together. When the chambers 12 and 14 of the air bag inflate, the zero length tethers 24 maintain a specific thickness of the airbag 10 rather than allowing the airbag 10 to form a spherical shape. As one of ordinary skill in the art would recognize, there are various ways to form a chamber and control the shape of the inflated airbag. The invention is in no way limited to this particular shape, configuration, or technique for construction as illustrated in FIG. 1.

Figure 3:
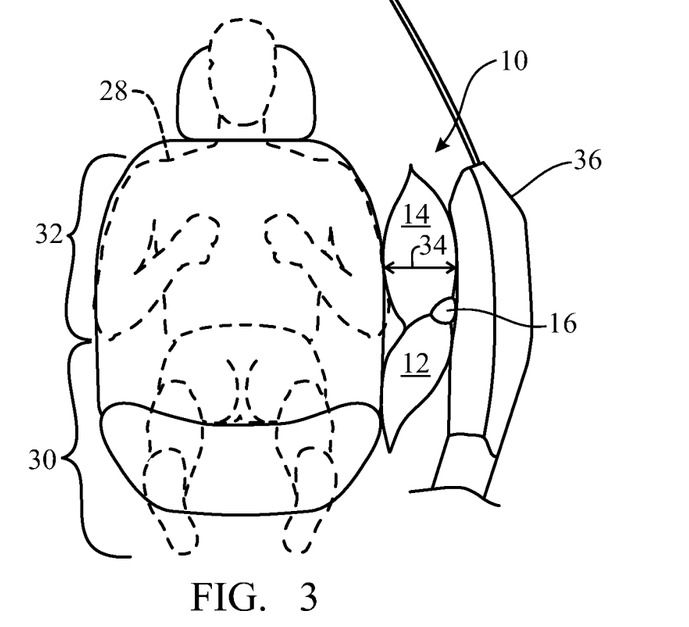
FIG. 3 is a view of an inflated side impact airbag of FIG. 1 adjacent a vehicle passenger as viewed from the front looking rearward, the side impact airbag being shown in cross-section revealing the cross-section of an inflated duct.
Figure 4:
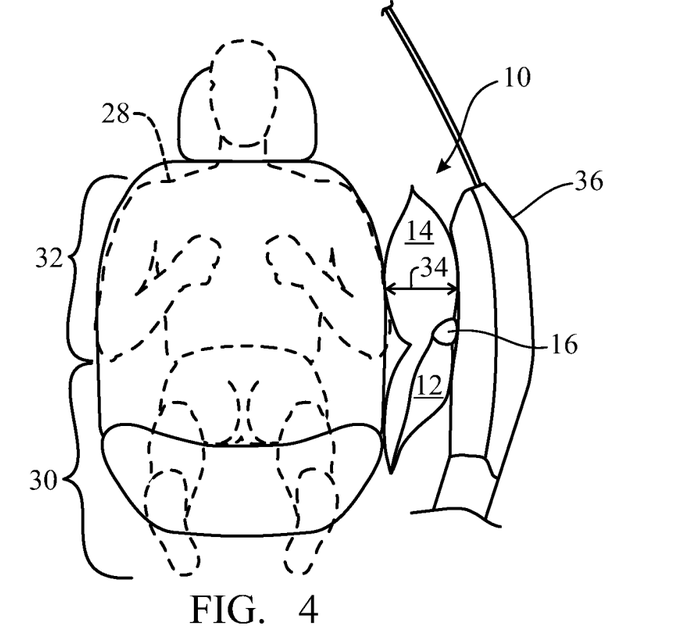
FIG. 4 is a view of an inflated side impact airbag of FIG. 2 adjacent a vehicle passenger as viewed from the front looking rearward, the side impact airbag being shown in cross-section revealing the cross-section of an inflated duct disposed in an alternative position.

FIGS. 3 and 4 illustrate an airbag 10 mounted within a motor vehicle. The inflatable air bag 10 may have multiple chambers 12 and 14 with each chamber designed to provide suitable protection to a particular region of an occupant 28. As an example, the embodiment of FIGS. 1 and 3 have an exemplary configuration of an upper thorax chamber 14 and a lower pelvis chamber 12. In this particular example, the upper thorax chamber 14 protects an occupant's thorax region 32 and the lower pelvis chamber 12 protects an occupant's pelvis region 30. An occupant's thorax region 32 and pelvis region 30 generally require different levels of protection. To allow for different levels of protection, the upper thorax chamber 14 and lower pelvis chambers 12 may be inflated to different pressures and at different rates. For example, it may be desirable for the pelvis chamber 12 to inflate to a higher pressure since there is less soft tissue of the occupant 28 to protect in the pelvis region 30. Conversely, the thorax chamber 14 may inflate to a lower pressure to protect the soft tissue and vital organs of the occupant located in the thorax region 32. In addition to inflating to different pressures, it may be desirable to have different rates of inflation. For example, the thorax chamber 14 may inflate immediately while delaying the inflation of the pelvis chamber 12, or the pelvis chamber 12 may inflate immediately while delaying inflation of the thorax chamber 14. It may be desirable to begin inflation of the thorax chamber 14 first in situations when the thorax chamber 14 has an internal volume substantially larger than that of the pelvis chamber 12. In other instances it may be desirable to inflate the pelvis chamber 12 immediately when the inflated pelvis chamber 12 positions the thorax chamber 14.

Figure 2:
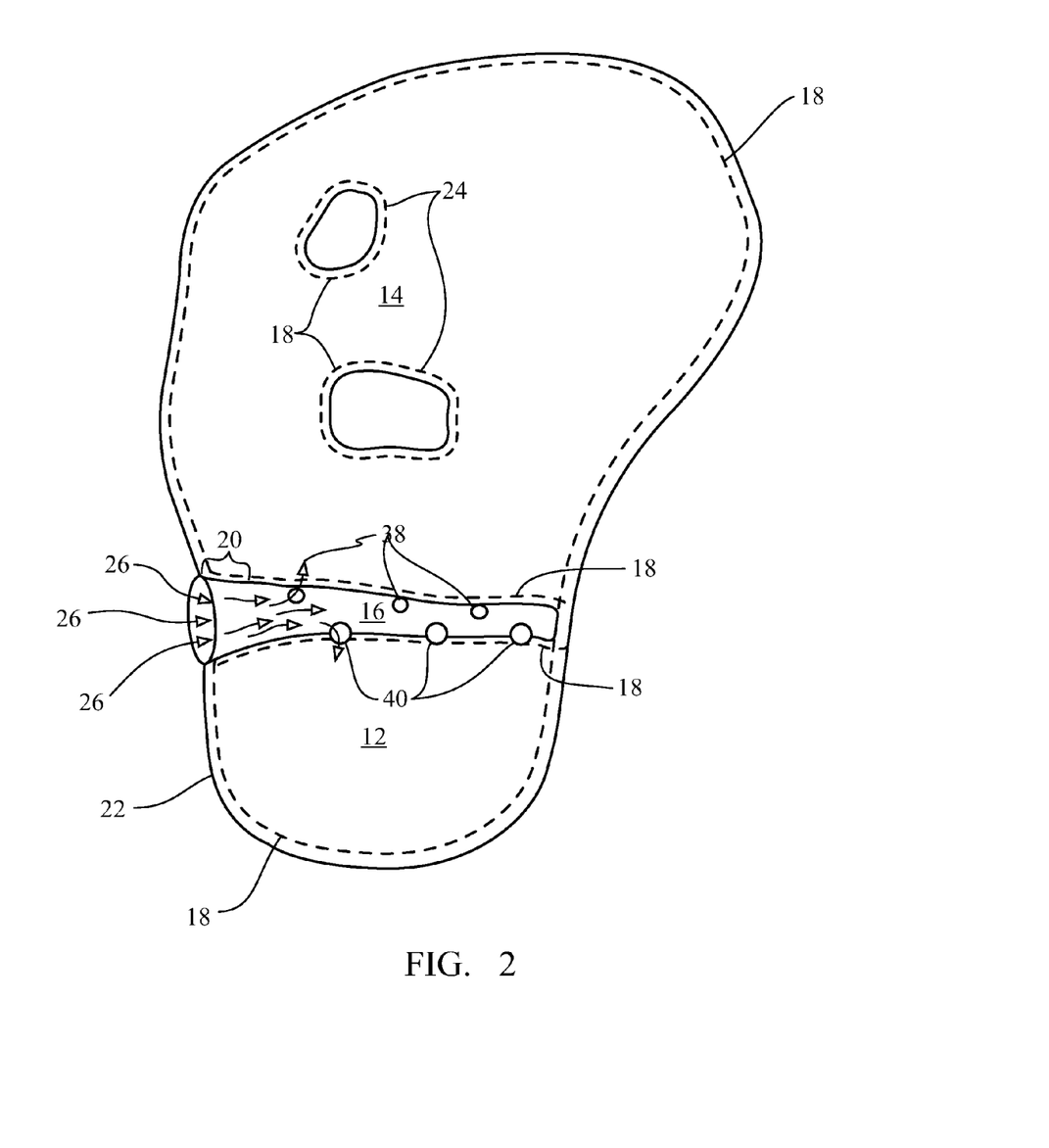
FIG. 2 is a side plan view of an airbag having a combination pelvis and thorax chamber in addition to a pelvis chamber and the inlet of the inflatable duct.

FIGS. 1 and 3 illustrate a side air bag 10 in which the pelvis chamber 12 and thorax chamber 14 each face the occupant 28, while FIGS. 2 and 4 illustrate an example of an inflatable airbag 10 in which only one chamber 14 faces the occupant 28. In the embodiment of FIGS. 2 and 4, the first chamber 14 provides protection to both the thorax region 32 and the pelvis region 30 while the second chamber 12 provides protection to the pelvis region 30. In such an embodiment, the entire surface of the side airbag 10 facing the occupant 28 can be of a lower pressure while the second chamber 12 may internal to the first chamber 14 and inflated to a higher pressure. This configuration provides a softer surface over the entirety of the airbag 10 facing the occupant 28, while still retaining the high-pressure required in the pelvis region 30.

Regardless of the configuration of the chambers 12 and 14, the pelvis chamber 12 is generally of a higher pressure so that the occupant 28 will not strikethrough the airbag 10. Strikethrough occurs when the internal pressure of the chambers 12 and 14 is insufficient to prevent the occupant 28 from passing through the depth 34 of the airbag chambers 12 and 14 and contacting the vehicle structure 36. To prevent strikethrough of the pelvis region 30 of the occupant 28, and by way of example, the internal pressure of the pelvis chamber 12 may be between 200 and 240 kilopascals. In contrast, the internal pressure of a typical thorax chamber 14 is between 60 and 80 kilopascals. The concentration of mass of an occupant's thorax region 32 is less than that of an occupant's pelvis 30, so higher pressure is not needed to prevent strikethrough. Other pressure ranges are possible depending on the configuration of the chambers 12 and 14. One of ordinary skill in the art will recognize that if chambers 12 and 14 have a thicker inflation depth 34, the inflation pressure may be lower, or if a chamber has a thinner inflation depth 34, a higher inflation pressure may be required.

FIGS. 1-4 each illustrate an inflatable duct 16 disposed intermediate the chambers 12 and 14. In the airbag 10 of FIG. 1, the inflatable duct 16 occupies a space located between the two chambers 12 and 14. The inflatable duct 16 may be inserted into a pocket created by the stitching 18 of the first chamber 12 and the second chamber 14, or the inflatable duct 16 may itself be the pocket created by the stitching 18 of the first chamber 12 and second chamber 14 such that the inflatable duct 16 is formed by the boundary of the first inflatable chamber 12 and the second inflatable chamber 14. The airbag 10 of FIGS. 2 and 4 show an inflatable duct 16 that is located adjacent to the inflatable chambers 12 and 14. Like the inflatable duct 16 depicted in FIG. 1, the inflatable duct 16 of FIG. 2 may be separate from the sheets of fabric, or may be a pocket formed by the stitching 18 of the sheets of fabric.

Each inflatable duct 16 of FIGS. 1-4 has generally a tube-shaped body with an inlet 20 at a near end for receiving an inflation gas 26. When stowed, the body of the inflatable duct 16 is collapsed such that there is no appreciable fluid communication from the inlet 20 through the body of the inflatable duct 16. When the inlet 20 receives a pressurized inflation gas 26 from an inflator (not shown), the body of the duct 16 will inflate when the inflation gas 26 pressure is higher than a pressure collapsing the inflatable duct 16. The inflatable duct 16 can be tuned to open in a controlled fashion, such as uniformly along a longitudinal extent of the body or linearly along the longitudinal extent. The inflatable duct 16 will continue to inflate so long as the inflation gas 26 maintains a pressure greater than the inflatable duct's 16 surrounding environment. When the pressure external to the inflatable duct 16 exceeds the inflation gas 26 pressure within the inflatable duct 16, the inflatable duct 16 will begin to collapse in a controlled fashion.

Sets of valves 38 and 40 are disposed within the body of the inflatable duct 16 and provide fluid communication through a wall of the duct to the inflatable chambers 12 and 14. Such valves 38 and 40 may be simple orifices within the wall of the inflatable duct 16, or may be more sophisticated, such as being a check valve allowing inflation gas 26 to pass in only one direction. When the body of the inflatable duct 16 is collapsed, the valves 38 and 40 are not exposed to the inflation gas 26 and no appreciable fluid communication exists from the inflation gas 26 to the inflatable chamber 12 and 14 associated with a given valve 38 and 40, respectively. In some embodiments, it is contemplated that a portion of valves 38 and 40 may be positioned near the inlet 20 such that fluid communication from the inlet 20 to the inflatable chamber 12 and 14 exists even when the inflatable duct 16 is collapsed.

Each of the valves 38 and 40 is configured to regulate the pressure and flow rate to the inflatable chambers 12 and 14. For example, a valve 40 with a larger cross sectional area will have a higher flow rate than a similar valve 38 with a lower cross section area. As a result, at a similar pressure, the larger valve 40 will deliver more inflation gas 26 to its corresponding inflatable chamber 12. Higher the flow rate relative to the volume of the chamber 12, the greater the resulting internal pressure of the chamber 12. One of ordinary skill in the art will recognize that other techniques are possible to regulate the flow rate of the valves 38 and 40 and the resulting chamber pressure. As an example, the valves 38 and 40 may be pressure-regulating valves or the chamber 12 and 14 may have a pressure regulated exhaust.

Figure 5:
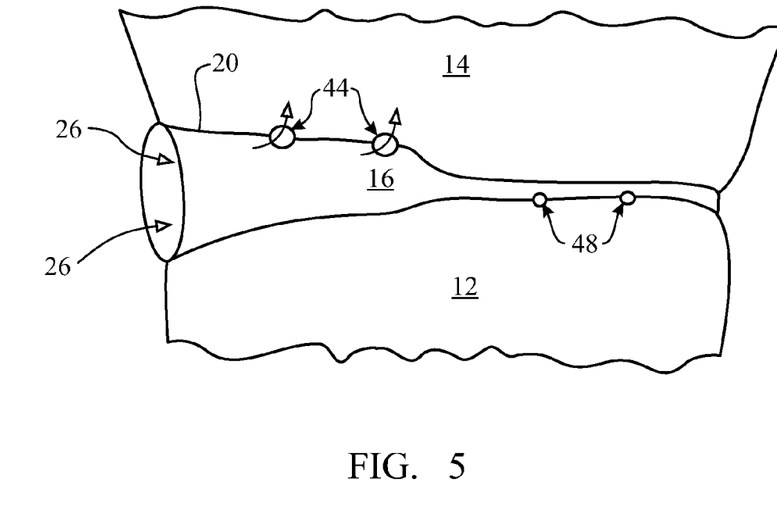
FIG. 5 is a detailed view of a partially inflated inflatable duct illustrating exposed valves.
Figure 6:
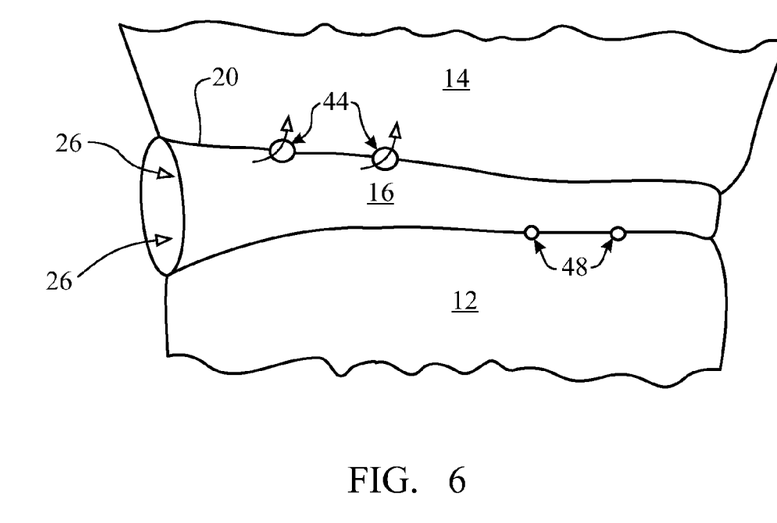
FIG. 6 is a detailed view of a fully inflated inflatable duct illustrating the fully inflated duct.

The positioning of the valves 38 and 40 will further affect the inflation of the inflatable chambers 12 and 14. For example, in an inflatable duct 16 that opens in a linear fashion along the longitudinal extent, valves 38 and 40 located near the inlet 20 will be exposed to the inflation gas 26 prior to those located distant the inlet 20. In this manner the rate of inflation of the chambers 12 and 14 can be controlled. As an example, the partially inflated inflatable duct 16 of FIG. 5 illustrates an inflatable duct 16 in which two valves 44 have been exposed to the inflation gas 26. Therefore, the chamber 14 associated with these valves 44 will begin inflating prior to the valves 48 not yet exposed to the inflation gas 26. With increasing gas pressure within the inflatable duct 16, the inflatable duct 16 may eventually reach the state, as shown in FIG. 6, in which the inflatable duct 16 has exposed each of the valves 44 and 48 to the inflation gas 26.

Eventually, the inflation gas 26 pressure within the inflatable duct 16 will fall below the pressure required to keep the inflatable duct 16 inflated. For example, the source of inflation gas 26 may become depleted such that there is a reduction in inflation gas 26 pressure, the inflatable chambers 12 and 14 may inflate to a high pressure collapsing the inflatable duct 16, or some combination of the above. After the inflatable chamber 16 collapses, once again there will be no appreciable fluid communication through a valve 48 located in the collapsed portion of the inflatable duct 16.

The inflatable duct 16 may be tuned to obtain a desired inflation rate and pressure for the inflatable chambers 12 and 14 associated with the inflatable duct 16. As an example, it may be desirable for the inflatable chambers 12 and 14 to inflate immediately upon exposure to the inflation gas 16, but to inflate for different lengths of time. As one of ordinary skill in the art would recognize, this can be accomplished by designing a portion of the inflatable duct 16 to collapse in response to an inflatable chamber 12 and 14 associated with that portion completing inflation. As the inflatable duct 16 collapses, there will be no further inflation gas 26 delivered to the inflatable chamber 12 and 14, and the inflation gas 26 will be channeled to the inflatable chamber 12 and 14 associated with the portion of the inflatable duct 16 that has not collapsed. In this way, the pressure of each chamber 12 and 14 is isolated from each other once the inflatable duct collapses 16. That is, there is no appreciable communication of inflation gas 26 between the chambers 12, 14.

In one example of such an embodiment, the inflatable duct 16 is tuned to deliver inflation gas 26 to the first chamber 12 from 0 to 10 milliseconds after delivery of the inflation gas 26 and to the second chamber 14 from 0 to 30 milliseconds after delivery of the inflation gas 26. In some embodiments, the first inflation chamber 12 protects the occupant's pelvis region 30 and the second inflation chamber 14 protects the thorax 32 region. In this example, it is desirable for the pelvis chamber 12 to inflate as quickly as possible to a high pressure, and to inflate the thorax chamber 14 at a lower pressure. In allowing the thorax chamber 14 to inflate at a lower pressure and at a lower inflation rate, the safety of the occupant 30 is increased.

Similarly, tuning the inflation duct 16 to deliver inflation gas 26 to the first chamber 12 from 0 to 15 milliseconds after delivery of the inflation gas 26 and to the second chamber 14 from 0 to 25 milliseconds after delivery of the inflation gas 26 may be beneficial.

In some embodiments it may be desirable for at least one chamber 14 to begin inflation prior to the inflatable duct 16 being inflated. In one embodiment, shown in FIG. 7, an acceleration port 50 can be included in inflatable chamber 14. The acceleration port 50 bypasses the inflatable duct 16 such that fluid communication between inflation gas 26 and the chamber 14 is independent of the state of the inflatable duct 16. For example, in some situations a larger inflation chamber 14 may require more inflation gas 26 and an earlier initiation of inflation than the inflatable duct 16 is capable of delivering. An acceleration port 50 can be included providing direct fluid communication from the larger inflation chamber 14 to an inflation gas source.

Figure 7:
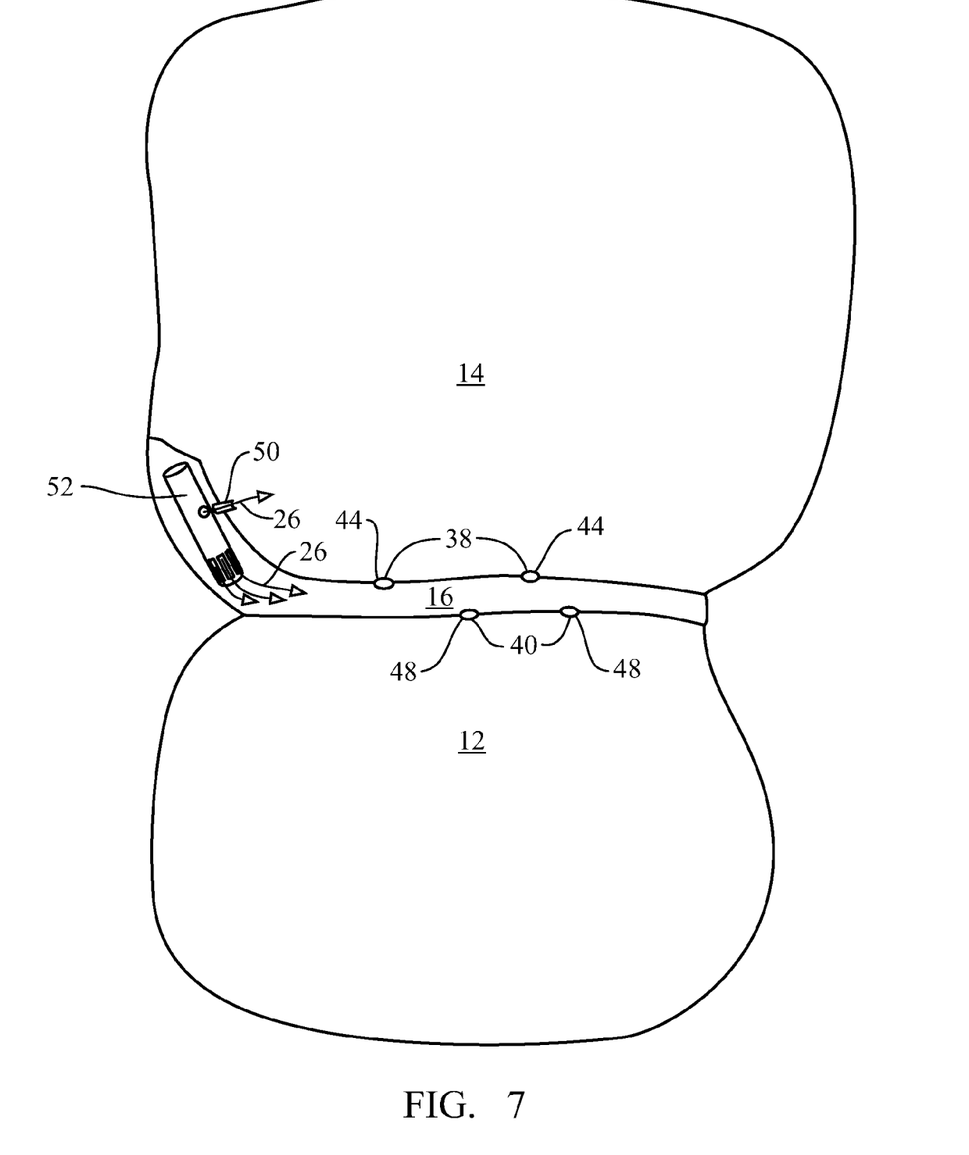
FIG. 7 is a side plan view of an air bag system showing an inflator and an acceleration port.

The present invention may be described as an embodiment of an airbag inflation system as shown in FIG. 7. In such a system, an inflator 52 delivers inflation gas 26 to the inflatable duct 16 to inflate the chambers 12 and 14. The inflator 52 delivers inflation gas 26 at a volume and pressure sufficient to inflate the inflatable duct 16 and inflatable chambers 12 and 14. Typically, the inflator 52 is tuned to deliver just enough inflation gas 26 to inflate the inflatable chambers 12 and 14 to a desired pressure and volume. The inflator 52 may be a pyrotechnic device that uses the combustion of gas-generating material to generate inflation gas, or alternatively, it may use a quantity of stored pressurize inflation gas, or some combination thereof as a hybrid inflator. As one of ordinary skill in the art would recognize, any inflator 52 suitable for use in an airbag can be used in the present invention so long as it is capable of delivering a sufficient volume of gas at a sufficient pressure and at a desired rate.

Figure 8:
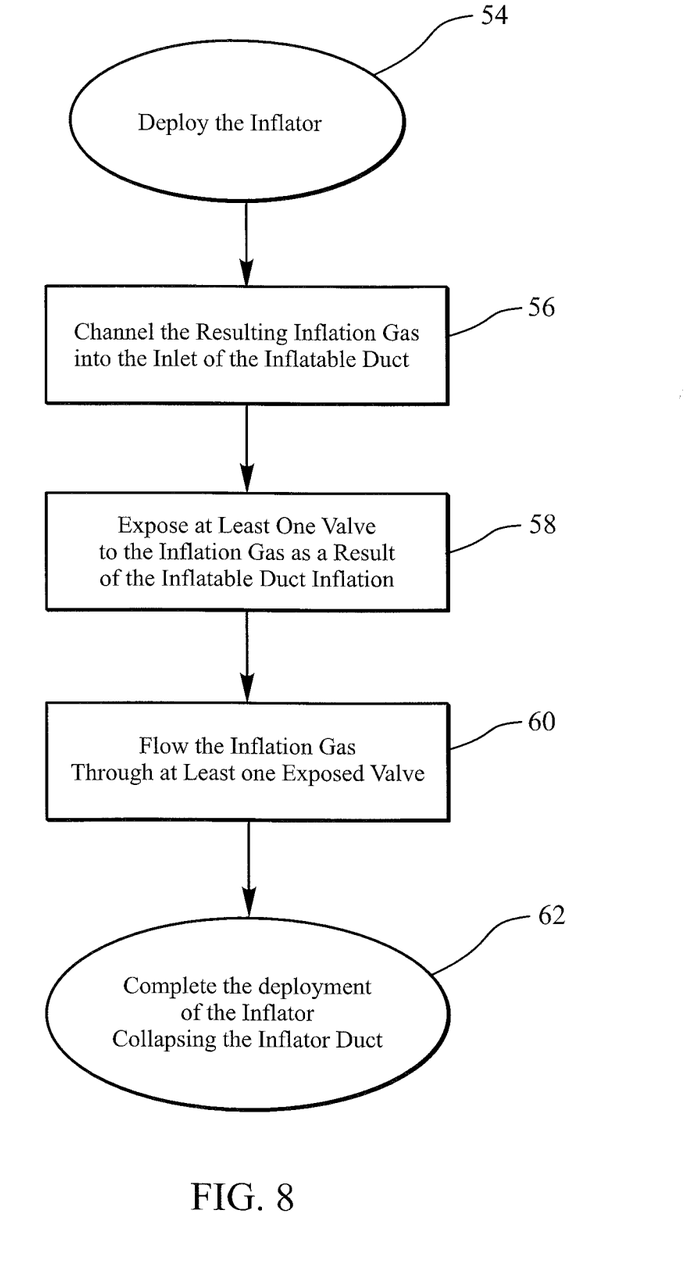
FIG. 8 shows a flow chart illustrates a method for inflating a side impact airbag.

As shown in FIG. 8, embodiments of the invention include a method for inflating an airbag having at least two chambers. The method comprises deploying an inflator 54, channeling the resulting inflation gas into an inlet of an inflatable duct 56, exposing at least one valve to the inflation gas as a result of the inflatable duct inflating 58, flowing the inflation gas through the exposed valve 60, and then completing the deployment of the inflator such that the inflatable duct collapses 62.

The deployment of the inflator 52 generates a stream of inflation gas 26. As one of ordinary skill in the art would recognize, the mechanism by which the inflator 52 is deployed and the mechanism for generating the stream of inflation gas 26 are well known in the art, and any suitable mechanism may be used so long as the inflator 52 delivers inflation gas sufficient to inflate the inflatable chambers 12 and 14 as desired.

The resulting stream of inflation gas 26 is then channeled into the inlet 20 of the inflatable duct 16. The inflation gas 26 may be channeled by the inflator 52 itself, or there may be an intermediate connection providing fluid communication. As a result of the inflation gas 26 being channeled into the inflatable duct 16 by way of the inlet 20, the inflatable duct 16 will begin to inflate. The inflation of the inflatable duct 16 is controlled based on the shape of the inflatable duct 16 and the position of valves 44 and 48 located on the walls of the inflatable duct 16. The inflatable duct 16 can be designed to inflate uniformly, such that the cross section of the inflatable duct 16 remains uniform along the longitudinal extent of the inflatable duct 16, or can be designed to inflate at different rates in different portions along the longitudinal extent of the inflatable duct 16.

As the inflatable duct 16 inflates, the valves 44 located on the walls of the inflatable duct 16 are exposed to the inflation gas 26 as the section of the inflatable duct 16 associated with the valve inflates. The valves 44 and 48 may each be exposed at the same time, or the inflatable duct 16 may be tuned to expose the valves 44 and 48 at different times.

Once a valve 44 is exposed to the inflation gas 26, the inflation gas 26 will flow through the valve 44 when the inflation gas 26 pressure is greater than the pressure within the corresponding chamber 14 associated with the valve 44. As the inflatable duct 16 inflates, eventually all of the valves 44 and 48 of the inflatable duct 16 will be exposed to the inflation gas 26.

The completion of the deployment of the inflator 52 will cause the inflation gas 26 pressure to be insufficient to maintain inflation of the inflatable duct 16. The pressure at which this occurs also depends upon the pressure of the inflatable chambers 12 and 14 and on the elasticity of the inflatable duct 16. In some embodiments, a portion of the inflatable duct 16 may collapse prior to the completion of the deployment of the inflator 52 such that the inflation gas 26 no longer flows through the valves 48 associated with the collapsed inflatable duct 16.

While the inflation gas 26 is channeled into the inlet 20 of the inflatable duct 16, the inflation rate of each of the inflatable chambers 12 and 14 may be controlled. The cross sectional area of the inflation duct 16 at least partially controls the rate at which the inflatable duct 16 inflates exposing the valves 44 and 48 located on the walls of the inflatable duct 16. This in turn controls the rate at which the chambers 12 and 14 inflate, since the chambers 12 and 14 will not begin to inflate until the valves 44 and 48 are exposed and the rate at which the chambers 12 inflate will be dependent on the number of exposed valves 44 corresponding to that inflatable chamber. Similarly, the number of valves 44 and 48 within the inflatable duct 16 corresponding to inflatable chambers 12, 14, respectively, will affect the relative inflation rate between the chambers. For example, if the valve sets 38 and 40 have valves of the same size, a chamber, such as chamber 12, with more valves in the valve set 140 in fluid communication will inflate at a greater rate than a chamber, such as chamber 14, if valve set 38 has fewer valves. Additionally, the cross sectional areas of the valves 44 and 48 can be varied to control the inflation rate of the corresponding chambers 12, 14. A chamber, such as chamber 14, having valves 44 in valve set 38 of a larger cross sectional area will have a higher inflation rate than a chamber such as chamber 12 having the same number of valves 48 in valve set 40, but with smaller cross sectional areas. The relative positioning of the valves within the valve sets 38 and 40 will affect the inflation rate of the inflatable chambers 12 and 14 as well. For example, if the juxtaposition of the first valve, such as valve 44 relative to the second valve such as valve 48 places the first valve in position to be exposed prior to the second valve, the chamber associated with the first valve will begin to inflate prior to the chamber associated with the second valve. While each of these features has been described singly, any number of them can be combined to obtain a particular inflation rate of a chamber.

The above-recited advantages may be associated with one or more of the present embodiments. The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. An air bag inflation system having at least two inflatable chambers, the air bag inflation system comprising:
   a first inflatable chamber;
   a second inflatable chamber, the second inflatable chamber being located adjacent the first inflatable chamber;
   an inflatable duct having a longitudinal extent disposed intermediate the first chamber and the second chamber, the inflatable duct having an inlet for receiving inflation gas, a first valve set comprising a plurality of first valves for fluid communication between the inflatable duct and the first chamber, the plurality of first valves comprises a near first valve disposed nearer the inlet than any other of the first valves, and a second valve set comprising a plurality of second valves for fluid communication between the inflatable duct and the second chamber, the plurality of second valves comprises a near second valve disposed nearer the inlet than any other of the second valves, the inflatable duct having a collapsed mode, an inflating mode, and an inflated mode; and an inflator for delivering inflation gas sufficient to inflate the inflatable duct through the inlet to the inflatable duct, wherein prior to delivery of the inflation gas the inflatable duct is in the collapsed mode wherein the flow of inflation gas into the first chamber and the second chamber is inhibited and the delivery of the inflation gas causes the inflatable duct to transition from the collapsed mode to the inflating mode exposing at least one of either the near first valve and the near second valve to inflation gas before the remainder of the plurality of first valves of the first valve set and the plurality of second valves of the second valve set are exposed to the inflation gas for inflation of at least one of either the first inflatable chamber and the second inflatable chamber, the inflatable duct is in the inflated mode when every one of the first valves and the second valves is exposed to the inflation gas, and wherein the inflatable duct collapses back into the collapsed mode in response to insufficient inflation gas pressure within the inflatable duct to isolate the inflation gas in the first inflatable chamber from the inflation gas in the second inflatable chamber and restrict fluid communication between the first inflatable chamber and the second inflatable chamber.

2. The air bag inflation system of claim 1 wherein adjusting the juxtaposition of the first valves along the longitudinal extent of the inflatable duct with the second valves disposed along the longitudinal extent of the inflatable duct adjusts the inflation rate for each of the first inflatable chamber and the second inflatable chamber such that one of the first inflatable chamber and second inflatable chamber is inflated to a higher pressure than the other.

3. The air bag inflation system of claim 1, wherein the inflatable duct has an interior wall and the location of each of the first valves along the longitudinal extent of the inflatable duct are offset from the location of each of the second valves disposed along the longitudinal extent of the inflatable duct such that as the inflatable duct collapses back into the collapsed mode the interior wall of the inflatable duct occludes one or more of either of the first valves or the second valves restricting fluid communication between the first inflatable chamber and the second inflatable chamber.

4. The air bag inflation system of claim 1 wherein the cross sectional area and the juxtaposition of the first valves with the second valves is configured to provide fluid communication between the inlet and the first chamber following activation of the inflator and between the inlet and the second chamber following activation of the inflator until the inflatable duct collapses due to the pressure within the inflatable duct being less than the pressure in either the first chamber or the second chamber.

5. The air bag inflation system of claim 1 wherein the cross sectional area and the juxtaposition of the first valves with the second valves is configured to provide fluid communication between the inlet and the first chamber from 0 to 25 milliseconds following activation of the inflator.

6. An inflatable air bag having at least two inflatable chambers for protecting a vehicle occupant, the inflatable air bag comprising:
   a first inflatable chamber;
   a second inflatable chamber, the second inflatable chamber being located adjacent the first inflatable chamber; and
   an inflatable duct having a longitudinal extent disposed intermediate the first chamber and the second chamber, the inflatable duct having an inlet for receiving inflation gas, a first valve set comprising a plurality of first valves disposed along the longitudinal extent of the inflatable duct for fluid communication between the inflatable duct and the first chamber, the plurality of first valves comprises a near first valve disposed nearer the inlet than any other of the first valves, and a second valve set comprising a plurality of second valves disposed along the longitudinal extent of the inflatable duct for fluid communication between the inflatable duct and the second chamber, the plurality of second valves comprises a near second valve disposed nearer the inlet than any other of the second valves; and wherein the delivery of the inflation gas to the inlet causes the inflatable duct to inflate thereby exposing at least one of either the near first valve of the first valve set and the near second valve of the second valve set to the inflation gas for inflation of at least one of either the first inflatable chamber and the second inflatable chamber, and wherein the inflatable duct collapses in response to insufficient inflation gas pressure within the inflatable duct to isolate the inflation gas in the first inflatable chamber from the inflation gas in the second inflatable chamber and to restrict fluid communication between the first inflatable chamber and the second inflatable chamber.

7. The inflatable air bag of claim 6 wherein adjusting the juxtaposition of the first valves along the longitudinal extent of the inflatable duct with the second valves disposed along the longitudinal extent of the inflatable duct adjusts the inflation rate of each of the first inflatable chamber and the second inflatable chamber.

8. The inflatable air bag of claim 6 wherein the inflatable duct has a cross sectional area, wherein given the cross sectional area and the juxtaposition of the first valves and the second adjusting the relative size of the first valves with the relative size of the second valves adjusts the inflation rate of each of the first inflatable chamber and the second inflatable chamber.

9. The inflatable air bag of claim 8 wherein the cross sectional area and the juxtaposition of the first valves with the second valves is configured to provide fluid communication between the inlet and the second chamber from 0 to 15 milliseconds following delivery of the inflation gas.

10. The inflatable air bag of claim 8 wherein the cross sectional area and the juxtaposition of the first valves with the second valves is configured to provide fluid communication between the inlet and the first chamber from 0 to 25 milliseconds following delivery of the inflation gas.

11. The inflatable air bag of claim 6 wherein the first inflatable chamber comprises a thorax chamber and the second inflatable chamber comprises a pelvis chamber.

12. The inflatable air bag of claim 11 wherein the thorax chamber is configured to deploy such that the thorax chamber positions between the pelvis chamber and the vehicle occupant.

13. The inflatable air bag of claim 6 wherein at least one of either the first valves and the second valves is a check valve.

14. The inflatable air bag of claim 6 wherein the inflatable duct is formed by the boundary of the first inflatable chamber and the second inflatable chamber.

15. A method for inflating an airbag having at least two inflatable chambers, the method comprising the acts of:
   deploying an inflator thereby generating a stream of inflation gas;
   channeling the stream of inflation gas into an inlet of an inflatable duct having a longitudinal extent, thereby inflating the duct;

providing a plurality of first valves in a first valve set, the first valves being disposed along the longitudinal extent of the inflatable duct;

providing a plurality of second valves in a second valve set, the second valves being disposed along the longitudinal extent of the inflatable duct;

exposing at least one first valve from among the plurality of first valves in the first valve set to the inflation gas for fluid communication between a first inflatable chamber and the inflatable duct;

exposing at least one second valve from among the plurality of second valves in the second valve set to the inflation gas for fluid communication between a second inflatable chamber and the inflatable duct;

flowing the inflation gas through each of the exposed first valves and second valves from among the first valve set and the second valve set sequentially along the longitudinal extent of the inflatable duct, the inflation gas flowing through the exposed first valves and second valves nearer the inlet of the inflatable duct before flowing through the exposed first valves and second valves more distant from the inlet, thereby inflating the first inflatable chamber and second inflatable chamber;

completing the deployment of the inflator such that inflation gas pressure is insufficient to maintain inflation of the inflatable duct, thereby collapsing the inflatable duct to isolate the inflation gas in the first inflatable chamber from the inflation gas in the second inflatable chamber; and restricting fluid communication between the first inflatable chamber and the second inflatable chamber.

16. The method of claim 15 further comprising controlling the inflation rate of each of the inflatable chambers, the inflation rate being controlled by at least one of the features from the group of features including, a cross sectional area of the inflatable duct when inflated, the number of first valves and second valves, a cross sectional area of each of the first valves and second valves, and the juxtaposition of the first valves and second valves.

17. The method of claim 16 wherein the first inflatable chamber inflates between 0 to 30 milliseconds following the deployment of the inflator.

18. The method of claim 16 wherein the second chamber inflates to a pressure greater than the pressure to which the first chamber inflates.

* * * * *